Aug. 29, 1967  E. A. MEYER  3,337,925

FASTENER ASSEMBLY AND BUTTON FASTENER

Filed June 15, 1966

INVENTOR
ENGELBERT A. MEYER
BY Burton & Parker
ATTORNEYS

United States Patent Office 3,337,925
Patented Aug. 29, 1967

3,337,925
FASTENER ASSEMBLY AND BUTTON FASTENER
Engelbert A. Meyer, Union Lake, Mich., assignor to Warren Fastener Corporation, a corporation of Michigan
Filed June 15, 1966, Ser. No. 557,681
1 Claim. (Cl. 24—73)

This invention relates to an improved molding assembly, and particularly to the fastener elements making up the assembly, which include a button secured to and extending from a support, and an adapter which serves to interconnect the molding device to the support.

This application is a continuation-in-part of my copending application Ser. No. 300,942, Fastener Assembly, filed Aug. 8, 1962 now Patent No. 3,290,852.

Molding devices are used in the manufacture of automobiles, refrigerators, and the like to meet functional and design requirements.

As suggested in said copending application, in original equipment manufacture, such as in the manufacture of automobiles, the button is preferably attached to the support in accordance with the general methods described in United States Letters Patent Nos. 3,153,468, 3,188,730 or 3,188,731 wherein the button is welded to steel or adhesively secured to various materials including steel. However, this method may be too costly or impractical when a single button is to be replaced, or where the molding is to be replaced by a repair shop or the like not having easy access to special welding equipment or adhesive materials used in attaching the button in the preferred manner, and, therefore, as disclosed in said copending application, I have provided a button which may be threadedly attached to the automobile, refrigerator or the like.

A suitable size button, presently used in the mass production of automobiles, involves a button which is welded to the automobile body panel, the button being 0.200 inch in diameter at its head and 0.160 inch in height, with the shank being slightly greater than one-half the diameter of the head. Utilization of this new concept in trim attachment in the automotive field produces substantial economies and advantages over previous methods. Similar economies and advantages are obtained in other fields, such as home appliances refrigerators, stoves, and the like. The button disclosed in the instant application is designed to be interchangeable with this weld on button, without requiring welding or adhesive process equipment.

The instant invention will be described in the context of an automotive molding assembly.

An object of this invention is to provide a molding assembly which is interchangeable with the molding assemblies I have disclosed previously, but which does not require welding or adhesive bonding equipment.

Another object of this invention is to provide a male button fastener adapted to be received within a female clip or adapter such as the clip disclosed in my copending application, of which this a continuation-in-part. Other clip or adapter means, such as disclosed in U.S. Patent Nos. 3,239,988 or 3,153,468, for attaching a hollow channel to the surface of a support, may be used by applying the teachings of my said copending application to buttons designed to receive such clips, and I have disclosed herein, by way of example, a button which may be secured to an automobile body panel without welding or adhesives, and designed to receive an adapter of the general type disclosed in my U.S. Patent No. 3,329,988.

A further object of this invention is to provide a replacement button which is interchangeable with a welded or adhesively secured button, such as described in United States Letters Patent Nos. 3,153,468 and 3,239,988.

The clip or adapter means disclosed herein for purposes of illustration is identical to the clip disclosed in my aforesaid copending application. The clip disclosed herein is formed into a sled having outwardly bowed runners designed to engage channels formed by opposed inturned flanges of a longitudinal molding, such as used in automotive assemblies. The clip may be formed from a single piece of sheet material by standard stamping, bending or forming machines. A socket depends from the top of the clip and is designed for aligning and locking coaction with a button described hereinbelow.

The button of this invention has a head portion and and a shank portion with a radially extending flange portion therebetween. The shank portion is a sheet metal screw which is threaded into a support, such as an automobile body panel. The radially extending flange portion is of a greater diameter than the threaded shank, and limits penetration of the shank in the support. The head portion of the button has a downwardly facing surface spaced from the radially extending flange portion by a reduced diameter neck portion. The configuration of the head will depend upon the particular adapter or clip means employed in the molding assembly and may be generally T-shaped in cross section similar to the disclosure of U.S. Patent No. 3,239,988, or generally diamond shaped in cross section, as disclosed herein, and in U.S. Patent No. 3,188,731.

The clip means is received beneath the downwardly facing surface of the button and is resiliently biased toward the support. The clip means is also provided with opposed downwardly facing portions which are adapted to receive therebeneath and retain oppose flanges of the hollow channel.

Other objects, advantages, and meritorious features will more fully appear from the following specification, claim and accompanying drawings wherein:

Figure 1:
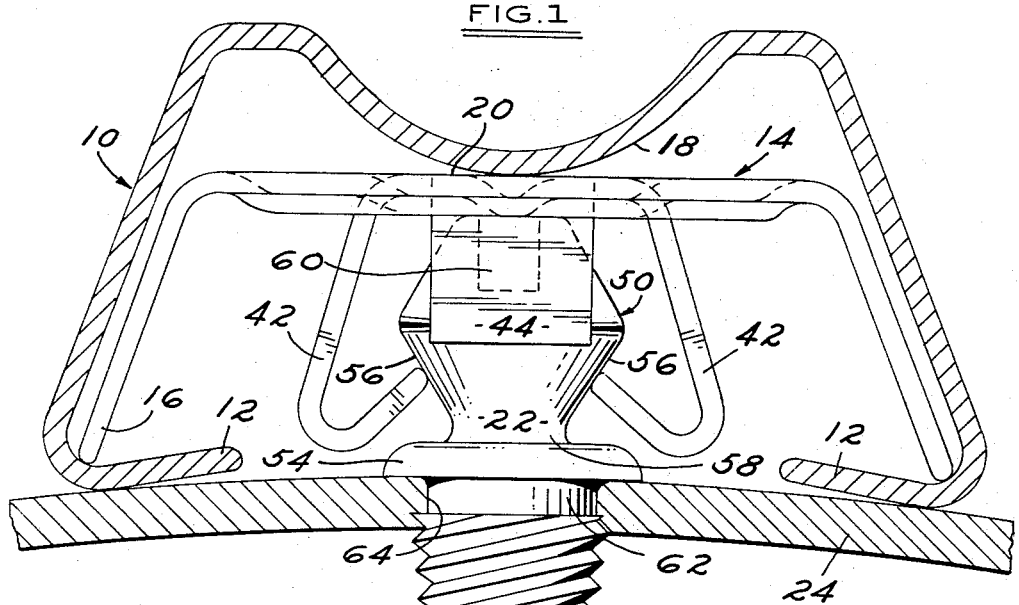
FIG. 1 is a cross sectional view of the molding assembly.

The illustrative molding assembly of FIG. 1 includes a molding device 10, a clip or adapter means 14, a male button fastener 22, and a support 24. The molding 10 is a hollow channel having oppositely inturned longitudinal flanges 12; the clip engaging the flanges 12 with its runners 16 and engaging the under surface 18 of the molding 10 with its top 20. The clip 14 may be assembled by insertion at the end of the molding 10; a plurality of clips 14 being arranged in a predetermined pattern in accordance with the orientation of a plurality of buttons 22 secured to the automotive support 24 in a predetermined alignment.

The female clip 14 is described more fully in my abovementioned copending application, and includes two catch panels 42 and two transverse cam panels 44 which receive and align the male button fastener 22.

The embodiment of the male button fastener of the illustrated assembly has a head portion 50, a shank portion 52 and a radially extending flange portion 54 therebetween. The head portion of the button is generally diamond shaped in cross section, and includes a downwardly facing surface 56 spaced from the plane of the flange portion 54 by a neck portion 58. It can be seen from FIG. 1 that the neck portion 58 has a smaller diameter than the diameter of the head portion at 56.

The shank portion 52 is a sheet metal screw, and has a diameter less than the diameter of the flange portion 54, so that the flange will limit and determine the penetration of the threaded shank into the support 24. It can be seen from FIG. 1 that the catch panel 42 of the clip are received beneath, and tensioned against, the downwardly facing surfaces 56 of the button head. Thus, the downwardly facing surfaces 56 must be spaced from the plane of the support, which is determined by the radially extending flange portion 54.

The button fastener of this embodiment has a screwdriver slot 60 which extends downwardly toward but terminates upwardly from the downwardly facing surface 56. The screwdriver slot is engaged to urge the self-tapping threaded shank 52 into the support 24. The slot is spaced from the downwardly facing surface 56 so as not to limit the surface available for contact with the inwardly extending catch panels 42 of the clip.

A radial groove 62 has been provided on the shank portion of the button adjacent the radially extending flange 54. The diameter of the shank at the groove is slightly less than the diameter of the aperture 64 in the support, and the axial width of the groove is slightly less than the thickness of the panel 24. This groove eliminates a manufacturing problem of the button, and allows the buttons to be made at less expense without sacrificing the integrity of the assembly. Because of the relatively small size of the button, it is very difficult, without special machinery, to thread the shank portion up to the flange 54. The threads will be imperfect adjacent the shank, and the button cannot, therefore, be fully seated in the support. This will vary the height of the clip engaging surfaces 56, and the assembly may be affected. The groove 62 eliminates the need for threads adjacent the radial flange 54, and allows full seating of the button in the support. By making the axial width of the groove less than the thickness of the panel, the threads still provide the driving engagement required to fully seat the button, while eliminating imperfect threads which interfere with the assembly.

Figure 2:
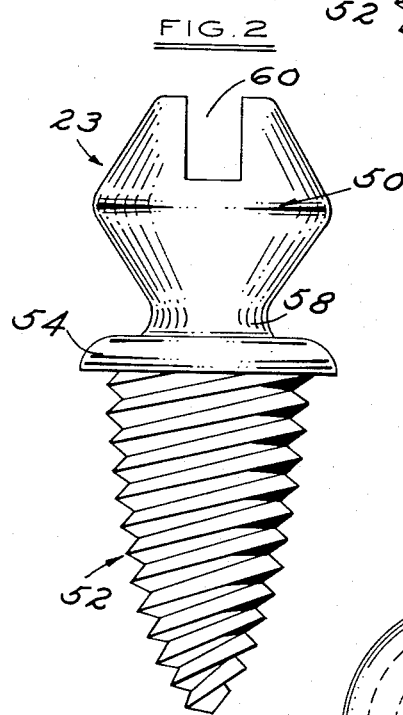
FIG. 2 is a side elevation of another embodiment of the male button fastener shown in FIG. 1.

The button fastener 23 of FIG. 2 is identical to the button 22 shown in FIG. 1, except that a groove has not been provided on the shank 52 of the button adjacent the flange portion 54. This embodiment of the button fastener may be utilized where seating of the button is not critical, where special thread forming techniques are used, or where a relatively soft material is used for the button, such as brass. It should be noted, however, that a brass button will not be self-tapping, and special thread forming techniques will increase the cost. The button of FIG. 2 has been otherwise numbered the same as the button in FIG. 1.

Figure 3:
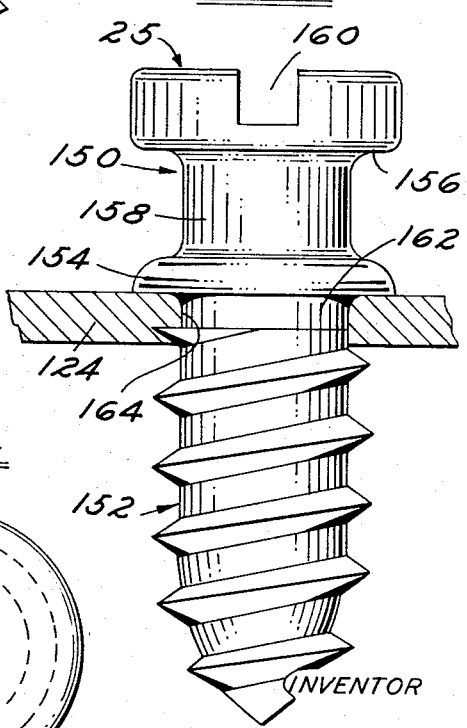
FIG. 3 is another embodiment of a male button fastener.
Figure 4:
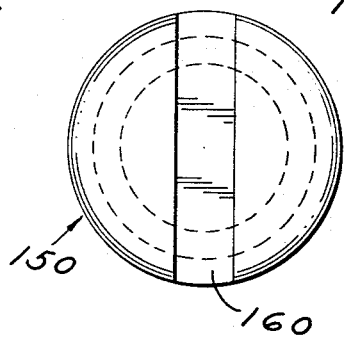
FIG. 4 is an end view of the male button fastener embodiment shown in FIG. 3.

The male button fastener 25 shown in FIGS. 3 and 4 is similar to the button 22 shown in FIG. 1, except that the head portion is generally T-shaped in cross section to receive a different form of adapter, such as the adapter disclosed in U.S. Patent No. 3,239,988. The neck portion 158 is therefore more pronounced, and the downwardly facing surface 156, which retains the clip or adapter means, is planar rather than conical as shown in FIG. 1. The button has been numbered in the same sequence as the button in FIG. 1.

While the button has been described with reference to certain adapters or clips, it is understood that various adapters may be used, and the shape of the button head varied without departing from the purview of the appended claim or the principles of my invention as disclosed herein and in my said copending application.

What is claimed is:

A fastener assembly for attaching a hollow channel member to a support, comprising: a button having a head portion spaced from the plane of the support by a neck portion, said button having a screw threaded shank portion penetrating said support, and a radially extending flange portion defined between said neck portion and said threaded shank, said head portion of a diameter greater than said neck portion and having a downwardly facing surface, said flange portion of a diameter greater than said threaded shank portion limiting and determining the penetration of said threaded shank portion in said support with said flange portion engaging said support, said threaded shank portion having a radial groove defined adjacent said flange portion of a diameter less than the crest of the threaded shank adjacent the groove, said groove having an axial width less than the thickness of the support to which it is attached, and a clip means having portions received beneath said downwardly facing surface of said button, said clip means having opposed downwardly facing portions adapted to receive therebeneath and retain opposed flanges of a hollow channel member.

References Cited

UNITED STATES PATENTS

| | | | |
|---|---|---|---|
| 1,389,758 | 9/1921 | Holmes | 24—219 |
| 1,537,798 | 5/1925 | Carr | 24—219 |
| 1,653,598 | 12/1927 | Carr | 24—219 |
| 2,160,706 | 5/1939 | Olson | 85—47 |
| 2,346,769 | 4/1944 | Lichtor | 52—511 X |
| 2,955,690 | 10/1960 | Bedford | 52—718 |
| 3,153,468 | 10/1964 | Sweeney | 52—718 |

FRANK L. ABBOTT, *Primary Examiner.*

M. O. WARNECKE, *Assistant Examiner.*